Feb. 18, 1964 R. S. ARBON 3,121,804

PULSE COUNTER EMPLOYING PARALLEL FEED INPUT WITH EXTERNAL GATING TO CONTROL SEQUENCING

Filed July 29, 1959 3 Sheets-Sheet 1

INVENTOR
ROBERT STANLEY ARBON
BY Kirschstein, Kirschstein & Ottinger
ATTORNEYS

INVENTOR
ROBERT STANLEY ARBON
BY Kuschtin, Kuschtin & Ottinger
ATTORNEYS

Feb. 18, 1964 R. S. ARBON 3,121,804

PULSE COUNTER EMPLOYING PARALLEL FEED INPUT WITH EXTERNAL GATING TO CONTROL SEQUENCING

Filed July 29, 1959 3 Sheets-Sheet 3

INVENTOR
ROBERT STANLEY ARBON

BY Kirschstein, Kirschstein & Ottinger
ATTORNEYS

United States Patent Office 3,121,804

Patented Feb. 18, 1964

3,121,804

PULSE COUNTER EMPLOYING PARALLEL FEED INPUT WITH EXTERNAL GATING TO CONTROL SEQUENCING

Robert Stanley Arbon, Rickmansworth, England, assignor to The General Electric Company Limited, London, England Filed July 29, 1959, Ser. No. 830,308
Claims priority, application Great Britain July 30, 1958
6 Claims. (Cl. 307—88.5)

Figure 1A:
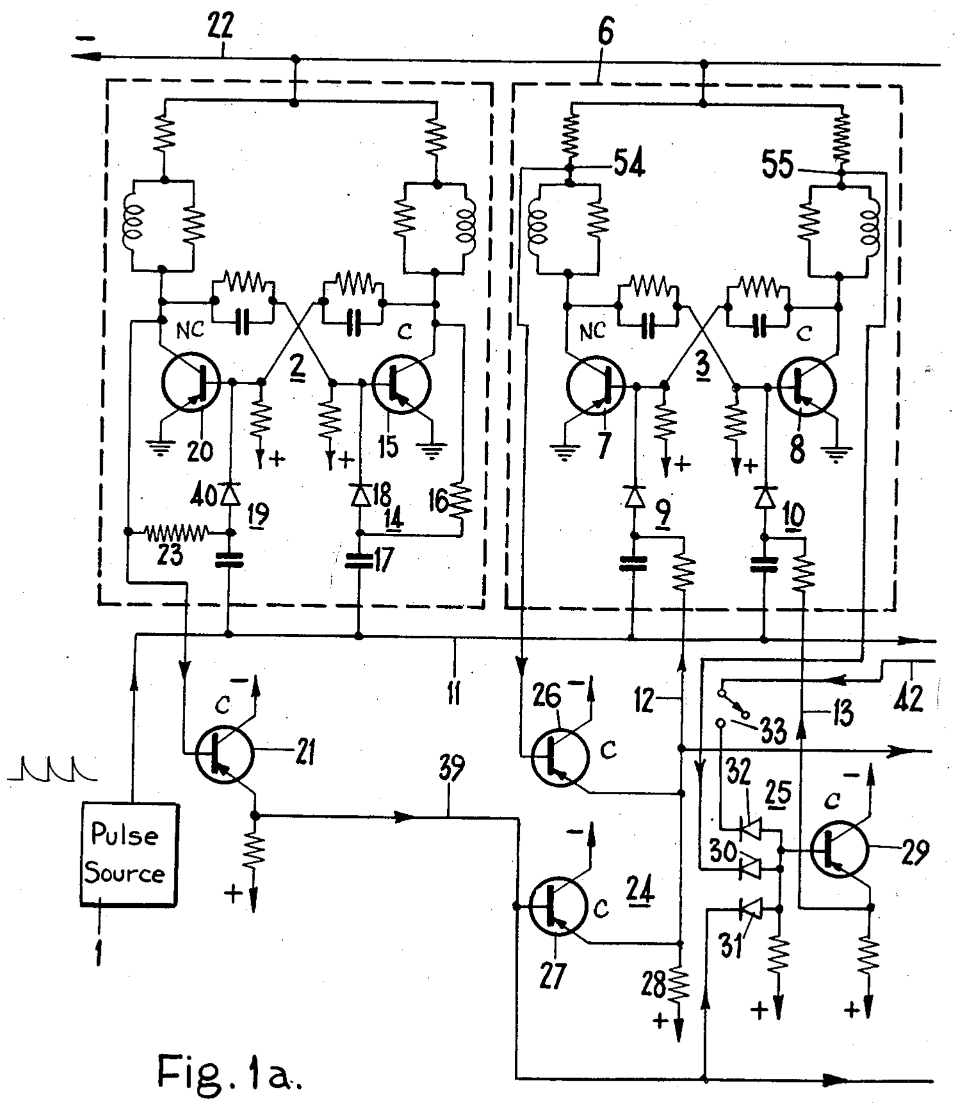

This invention relates to electric pulse counting circuits.

The invention is particularly concerned with electric pulse counting circuits of the kind which comprises a plurality of stages. These stages are so connected as each to store one digit of the number counted. Each said stage comprises bistable switching means that is arranged to represent a different one of the binary digits "0" and "1" by each of its two stable states. Thus the states of all the bistable switching means at any time represents the number then registered by the counting circuit in a binary scale of notation.

In a counting circuit of this kind, it has previously been proposed to connect the stages in cascade. It also has been proposed to supply input pulses to be counted to only the first stage. Said first stage is arranged to store the digit corresponding to the lowest power of two, namely $2^0$. The switching signal for each of the other stages is derived from the immediately preceding stage. With such an arrangement there may be some delay after the occurrence of an input pulse before all the said switching means of the counting circuit take up their states consequent upon that pulse. This will be seen by considering the case in which the said switching means of the first three stages are all required to change from one state to another upon the occurrence of a particular input pulse. This input pulse itself causes the said switching means of the first stage to change its state but it is not until that change has been completed that any switching signal is passed to the second stage while again it is not until the said switching means of that stage has changed its state that any switching signal is passed to the third stage.

The delay in operation of such a counting circuit as is discussed above is undesirable if the circuit is required to count input pulses having a relatively high recurrence frequency.

An electric pulse counting circuit has been proposed which avoids this undesirable feature (1) by having the pulses to be counted applied simultaneously to the control grids of a plurality of thermionic pentode valves that are each associated with a different one of the counting stages, (2) by employing as each counting stage bistable switching means which is able to change state when the associated pentode valve is conducting, and (3) by arranging the pentode valve of every stage, except the lowest, to be conditioned when the said switching means of every lower stage is in one predetermined state so that it conducts in response to the next subsequent pulse to be counted, the pentode valve of the lowest stage conducting in response to every pulse to be counted. A disadvantage of this counting circuit is that a false count can result if any pentode valve remains conducting after its associated switching means changes state since in these circumstances, this switching means may change state a second time.

It is an object of the present invention to provide an improved electric pulse counting circuit of the kind specified above which avoids the aforementioned undesirable feature and in which the state of any said switching means can change only once in response to a pulse to be counted.

An electric pulse counting circuit which is in accordance with the present invention comprises a plurality of stages connected so as each to store one digit of the number counted in a binary scale of notation. Each of these stages comprises two transistors that are cross-connected to form a bistable arrangement. An input path over which are arranged to be supplied the pulses to be counted is connected to each said transistor of each stage by way of a gating device which is associated with that transistor. There is means to supply gating signals to the said gating devices, each gating signal being dependent upon the condition of the said stage including the transistor associated with the gating device to which the gating signal is supplied apart from the gating signals supplied to the gating devices associated with the stage of the counting circuit which is arranged to store the digit of lowest value, each gating signal also is dependent upon the condition of the other stages which are arranged to store digits of lower value. In this manner it is arranged that during operation of the counting circuit, the said stages take up conditions that are characteristic of the number of pulses supplied over said input path.

An electric pulse counting circuit which is in accordance with a feature of the present invention again comprises a plurality of stages connected so as each to store one digit of the number counted in a binary scale of notation. Each of these stages comprises first and second transistors which are cross-connected to form a bistable arrangement in the first stable condition of which the first transistor is cut-off and the second transistor is conducting while in the second stable condition the first transistor is conducting and the second transistor is cut-off. An input path over which are arranged to be supplied positive-going pulses to be counted is connected to the base electrodes of the first and second transistors of each of said stages by way of first gating devices and second gating devices respectively. Associated with each first gating device, there is means to supply a gating signal to permit the next pulse on the input path to be passed to the base electrode of the first transistor of the appropriate stage only if that stage is in its second condition and also the gating signal supplied to the gating device associated with the first transistor of the stage (if any) which is arranged to store the digit of next lower value is such as to cause that gating device to pass the next pulse on the input path to the base electrode of the appropriate first transistor. Associated with each second gating device, there is means to supply a gating signal to permit the next pulse on the input path to be passed to the base electrode of the second transistor of the appropriate stage only if that stage is in its first condition and also the gating signal supplied to the first gating device of the stage (if any) which is arranged to store the digit of next lower value is such as to cause that gating device to pass the next pulse on the input path to the base electrode of the first transistor of that stage. In this manner it is arranged that, during operation of the counting circuit, said stages take up conditions that are characteristic of the number of pulses supplied over said input path.

Figure 1B:
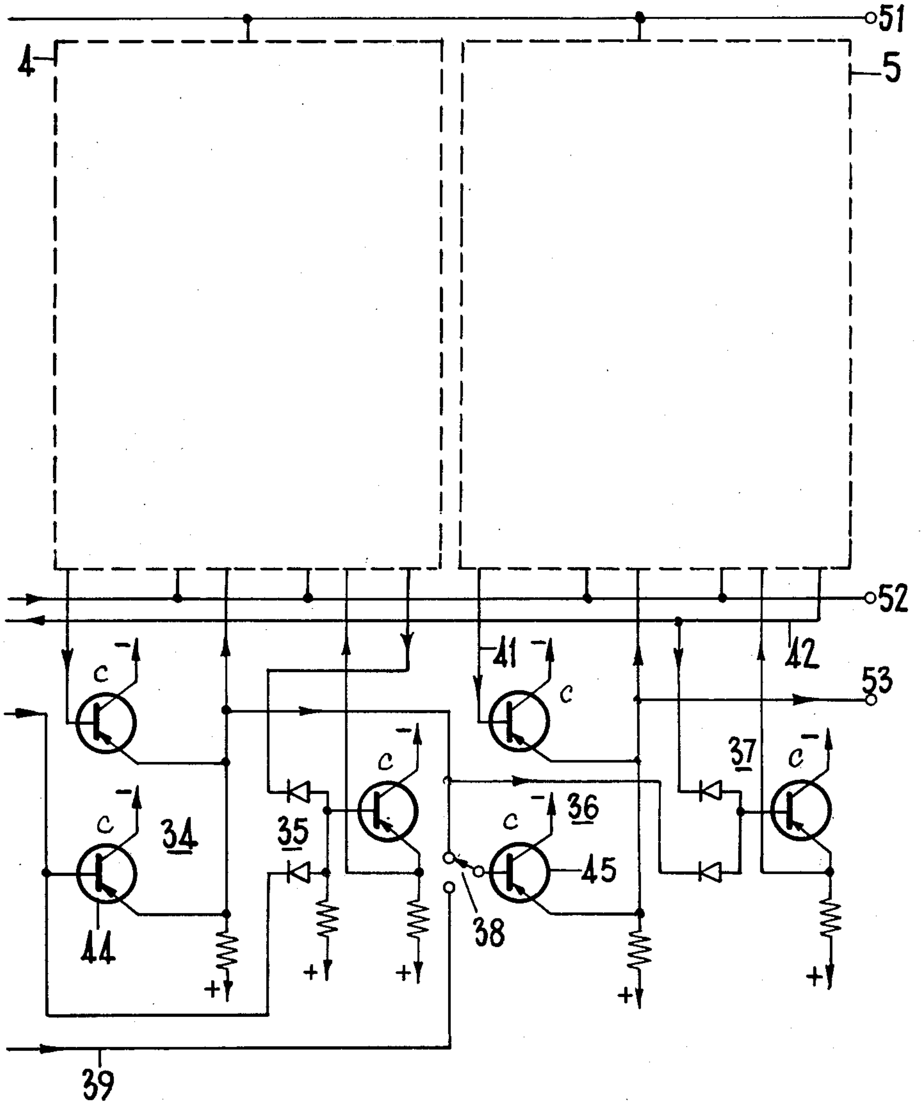
Figure 2:
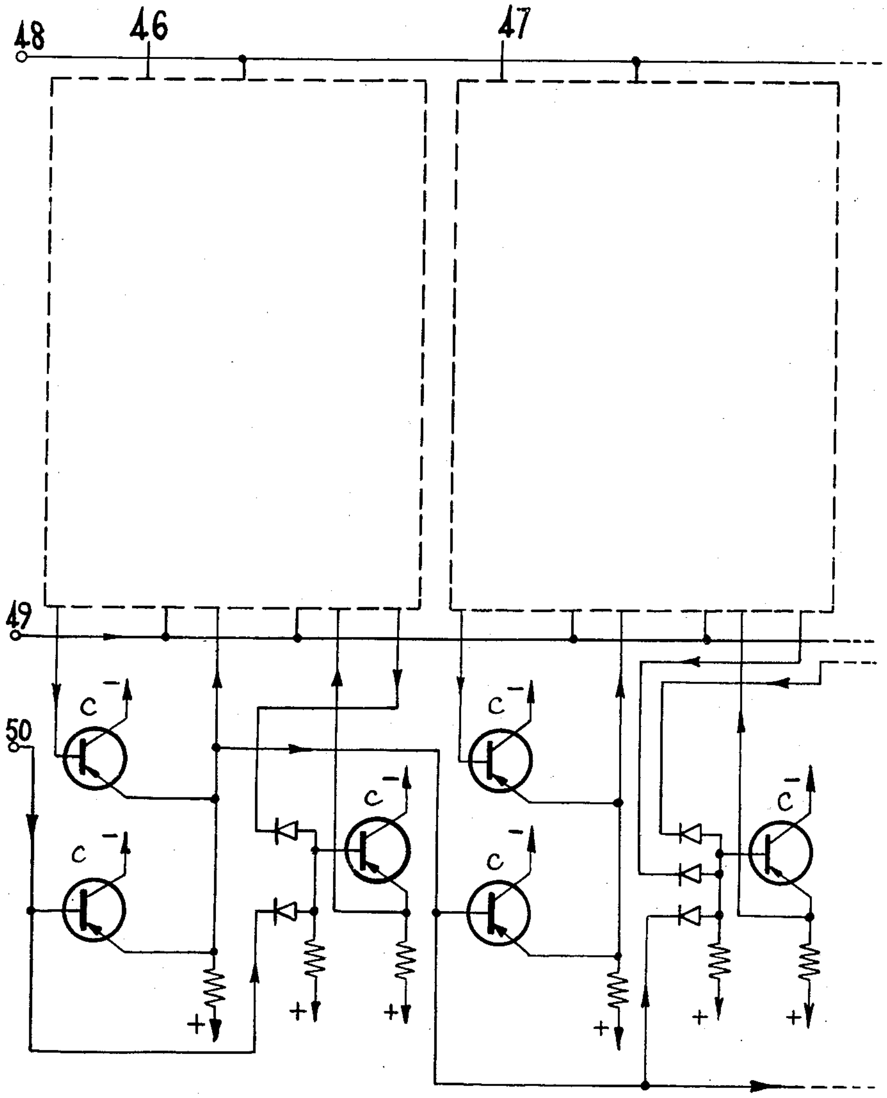

A pulse counting circuit in accordance with the present invention will now be described by way of example with reference to the accompanying drawings in which FIGURES 1*a* and 1*b* togeher show diagrammatically the circuit when FIGURE 1*b* is placed to the right of FIGURE 1*a*; and FIGURE 2 shows diagrammatically how the counting circuit of FIGURES 1*a* and 1*b* may be extended to count more digits.

The circuit now to be described is capable of effecting counting either in the straightforward binary scale of notation (in which each digit corresponds to a power of two) or in a binary-coded decimal scale. It is convenient first to consider only the binary mode of operation. Referring now to FIGURES 1*a* and 1*b*, the circuit is arranged to count the number of pulses supplied by the pulse source 1, these pulses being positive-going, and to register the resulting four-digit binary number. Each of these binary digits is stored by one of four bistable stages of which only the stages 2 and 3 are shown in the drawing. The other two bistable stages form part of units which are shown by the broken outlines 4 and 5 and which are exactly the same as the unit 6.

Considering now the bistable stage 3, it comprises two p-n-p junction transistors 7 and 8 which both have grounded emitter electrodes and which are cross-connected in known manner. Thus in a first stable condition, which can be considered to represent the digit "0," the transistor 7 is cut-off and the transistor 8 is conducting while in the other condition, which then represents the digit "1," the transistor 7 is conducting and the transistor 8 is cut-off.

Two gating devices, i.e. circuits, 9 and 10 are connected between the input path 11 over which are supplied from the source 1 the pulses to be counted and the base electrodes of the transistors 7 and 8. Gating signals are supplied to the gating devices 9 and 10 over paths 12 and 13 respectively and the gating device 9, for example, is only rendered conducting to permit a pulse to pass from the path 11 to the transistor 7 when there is a positive potential with respect to earth on the path 12.

The bistable stage 2 is basically the same as the stage 3, the only difference being that the gating signal supplied to the gating device, i.e. circuit, 14, which corresponds to the gating device 10 associated with the transistor 8, is derived directly from its associated transistor 15. This is done by connecting a resistor 16 between the collector electrode of the transistor 15 and the junction of the capacitor 17 and the rectifier element 18. Similarly the gating signal supplied to the gating device, i.e. circuit, 19, which is associated with the other transistor 20 of the bistable stage 2, is derived in the same manner by way of a resistor 23.

A further p-n-p junction transistor 21 is connected as an emitter follower stage with its base electrode connected directly to the collector electrode of the transistor 20. When the transistor 20 is cut-off, the collector voltage thereof is substantially equal to the voltage of the negative supply line 22 while when the transistor 20 is conducting, the collector voltage is nearer earth potential. In both these conditions, the voltage developed at the emitter electrode of the transistor 21 is substantially equal to that at the collector electrode of the transistor 20.

The gating signals supplied to the gating devices 9 and 10 are supplied by networks, i.e. circuits, 24 and 25 respectively. The network 24 comprises two p-n-p junction transistors 26 and 27 which are connected with a resistor 28 in their common emitter circuit, the base electrodes of the transistors 26 and 27 being connected to a tapping 54 on the collector electrode circuit of the transistor 7 and the emitter electrode of the transistor 21 respectively. It will be appreciated that, during operation, the voltages applied to the base electrodes of the transistors 26 and 27 can each have one of two values depending upon the condition of the transistors 7 and 20 and the transistors 26 and 27 are connected so that the voltage supplied to the path 12 by the network 24 is substantially equal to the more negative of the two voltages just considered. In other words, the voltage applied to the path 12 can only rise to the value necessary to render the gating device 9 conducting when the transistors 7 and 20 are both conducting.

The gating circuit formed by the transistors 26 and 27 is used rather than a simple "diode" gating circuit since it provides power gain and it has a lower voltage drop in the forward direction.

The network 25 comprises a p-n-p junction transistor 29 which is connected as an emitter follower stage in combination with two rectifier elements 30 and 31. (The rectifier element 32 need not be considered at the present time since the switch 33 is in the position shown in FIGURE 1*a* when the counting circuit is being used to effect counting in the straightforward binary scale.) The rectifier element 30 is connected between a tapping 55 on the collector electrode circuit of the transistor 8 and the base electrode of the transistor 29 while the rectifier element 31 is connected between the emitter electrode of the transistor 21 and the base electrode of the transistor 29. The voltage applied to the base electrode of the transistor 29 is thus the more negative of the voltages developed at the tapping 55 of the transistor 8 and the emitter electrode of the transistor 21 from which it follows that the gating signal supplied to the gating device 10 is only sufficient to render that device conducting when the rectifier elements 30 and 31 are both positively biassed, that is to say when the transistors 8 and 20 are both conducting.

The networks, i.e. circuits, 34 to 37 which are arranged to supply gating signals to the gating devices (not shown) of the units 4 and 5 are the same as the networks 24 and 25, at least when the switch 38 of the network 36 is in the position shown in FIGURE 1*b*.

Considering now the condition when each of the four bistable stages is storing the digit "0," that is to say the transistors 15 and 8 and the two corresponding transistors of the other two stages in the units 4 and 5 are all conducting while the transistors 20, 7 etc. are non-conducting. The conducting and non-conducting transistors in this condition of the counting circuit are labelled "C" and "NC" respectively. Only the rectifier element 18 of the gating device 14 is biassed to be conducting. Accordingly the next positive-going pulse supplied by the source 1 is passed through the gating device 14 to the base electrode of the transistor 15 and this causes the bistable stage 2 to change over to its other condition in which the transistor 20 is conducting and the transistor 15 is cut-off.

The collector electrode voltage of the transistor 15 and hence the base electrode voltage of the transistor 20 become more negative while the collector electrode voltage of the transistor 20 and hence both the base electrode voltage of the transistor 15 and the voltage of the path 39 become more positive. Therefore, this changeover has the effect of rendering the rectifier element 18 non-conducting and biassing the rectifier element 40 of the gating device 19 to be conducting. This increase in the voltage on the path 39 has the effect of increasing the voltage on the path 13 due to the fact that the collector electrode voltage of the transistor 8 is already at its higher value. The gating devices 10 and 19 are thus both predisposed to pass the next pulse supplied by the source 1 although none of the other gating devices of the counting circuit are so predisposed. This second pulse thus causes the bistable stage 2 to revert to this original condition and the stage 3 to change over to its condition in which the transistor 7 is conducting and the transistor 8 is non-conducting.

After the bistable stages 2 and 3 have changed over in the manner just described, only the gating device 18 is predisposed to pass the next pulse applied to the path 11. This pulse therefore causes the stage 2 to change over to its condition in which the transistor 20 is conducting and the transistor 15 is cut-off. The voltage then applied to the path 12 has its higher value so that the gating device 9 is predisposed to pass the next pulse from the source 1 while in addition, the voltage supplied by the network 35 has its higher value so as to render the appropriate gating device associated with the third bistable stage to be conducting.

Counting continues in this manner until each of the four bistable stages is storing the digit "1". The next input pulse then causes the circuit to revert to its original condition in which all the stages store the digit "0."

The transistors 21, 27, 44 and 45 are effectively connected as emitter follower stages which are themselves connected in cascade but since a feature of an emitter follower stage is that there is very little voltage drop across such a stage, it follows that there is sufficient voltage for satisfactory operation of the circuit even though four or more stages (as will be apparent hereinafter) are connected in cascade.

As previously described, the voltages developed at the tappings 54 and 55 on the collector electrode circuits of the transistors 7 and 8, for example, are utilised to control the networks 24 and 25 respectively. It would, of course, be possible alternatively to utilise the voltages actually developed at the collector electrodes of the transistors 7 and 8 for this purpose but such an arrangement is not preferred since it would increase the loading of the two transistors. In the case of the bistable stage 2, the resistors 16 and 23 could similarly be connected to tappings on the collector electrode circuits of the transistors 15 and 20 respectively but this would restrict the speed at which the counting circuit could operate and for high speed counting the connections shown in FIGURE 1*a* are preferred.

As so far described, the counting circuit is capable of counting up to "15," that is to say the binary number "1111," and it then resets itself to zero. The circuit may easily be modified for counting in the decimal scale the only changes that are necessary being effected by operation of the switches 33 and 38 to their alternative positions. When modified in this manner, the circuit operates exactly as before in respect of the first nine pulses supplied by the source 1. After the ninth pulse, the voltage supplied over the path 41 has its more positive value (due to the appropriate transistor in the unit 5 being conducting) while the transistor 20 is also conducting so that the voltage on the path 39 has its more positive value. The network 36 therefore supplies a gating signal to the appropriate gating device in the unit 5 to cause that gating device to be conducting for the next input pulse.

Furthermore, due to the fact that the fourth bistable stage is registering the digit "1," the voltage on the path 42 has its more negative value with the result that the gating signal supplied by the network 25 does not cause the gating device 10 to be conducting even though the transistor 8 is at that time conducting and the voltage on the path 39 has its more positive value due to the transistor 20 being conducting. In other words, the gating device 10 is not then predisposed to pass the next pulse on the path 11 as it would be if the counting circuit were operating in the manner previously considered.

It will be appreciated from the above that the tenth pulse supplied by the source 1 causes the two stages which are then storing the digit "1" to change over to store the digit "0". In other words, the counting circuit reverts to its original condition.

The counting circuit described above may be extended if it is required to count up to a binary number having more digits. Similarly, if it is required to add another decade when counting in the decimal scale, this may be done by duplicating the circuit already described with the modification that the second decade, instead of having the circuit shown in FIGURE 1*a*, should have that shown in FIGURE 2. In FIGURE 2, the units 46 and 47 are the same as the unit 6 in FIGURE 1*a* and the terminals 48, 49 and 50 are connected to the terminals 51, 52 and 53 respectively. The arrangement is such that the voltage at the terminal 53 is increased when the first decade has reached a count of nine while this voltage falls again when this decade is restored to a count of zero. This ensures that every tenth input pulse is caused to operate the second decade. Further decades may be provided in similar manner.

If a counting circuit in accordance with the present invention is required to supply an electric signal when a predetermined number of input pulses have been counted, this may be done by providing a coincidence gating circuit which is connected to some or all of the bistable stages of the counting circuit and which supplies the required output signal when the counting circuit is registering the desired number.

I claim:

1. An electric pulse counting circuit comprising a plurality of stages which are each to store a digit of different significance in the number counted, each said stage comprising first and second input circuits, first and second output circuits and two transistors that are cross-connected to form bi-stable switching means which is connected to said input and output circuits and which is switchable by pulses supplied to said first and second input circuits to first and second stable states wherein a predetermined output signal is supplied to the first and second output circuit respectively; an input path to receive the pulses to be counted; first gating circuits connected between the first input circuits respectively and the input path; second gating circuits connected between the second input circuits respectively and the input path; these first and second gating circuits facilitating the selective application of pulses on the input path to the input circuits; first circuit means connecting the first output circuit of the stage that is to store the digit of lowest significance in said number to the second gating circuit of that stage to render this gating circuit responsive to the pulses when the predetermined output signal is applied to this first output circuit; second circuit means connecting the second output circuit of this stage to the first gating circuit of this stage to render this first gating circuit responsive to the pulses when the predetermined output signal is applied to this second output circuit; coincidence circuits which are to render the gating circuits of the remaining stages responsive to said pulses selectively, whereby said switching means are switched by said pulses to particular stable states thereof representing the number counted in a binary scale of notation, and of which first coincidence circuits are each connected to the first gating circuit of a different one of the remaining stages so that each is thereby associated with a different one of these remaining stages; each first coincidence circuit being adapted to render its first gating circuit responsive to the pulses when there is coincidence of two predetermined signals applied thereto; third circuit means connecting the second output circuit of each said remaining stage to the first coincidence circuit associated with that stage to apply one of said two predetermined signals to the latter when said predetermined output signal is supplied to the former; fourth circuit means connecting the second output circuit of the first said stage to one of the first coincidence circuits to apply the other of said two predetermined signals to this coincidence circuit when the first said state has its second stable state; and fifth circuit means connecting each said first coincidence circuit, except one, to a different one of the remaining first coincidence circuits to apply the other of said two predetermined signals to the latter when said two predetermined signals are applied to the former.

2. An electric pulse counting circuit according to claim 1 wherein there are provided second coincidence circuits which are each connected to the second gating circuit of a different one of the remaining stages and which each is adapted to render its second gating circuit responsive to the pulses when there is coincidence of two predetermined signals applied thereto; and sixth circuit means connecting the first output circuit of each remaining stage to the second coincidence circuit associated with that stage to apply one of said two predetermined signals to that coincidence circuit when the switching means of its associated stage has its first stable state, and wherein the fourth circuit means which connects the second output circuit of the first stage to one of the first coincidence circuits, also connects that second output circuit to the particular one of said second coincidence circuits which is associated with the same stage as that first coincidence circuit; and the fifth circuit means also connects each said first coincidence circuit, except one, to a different one of said second coincidence circuits so that each said first coincidence circuit, except one, thus is connected to another said first coincidence circuit and to a second coincidence circuit which both are associated with the same stage.

3. An electric pulse counting circuit according to claim 2 wherein each first coincidence circuit comprises two transistors each having emitter, base and collector electrodes, a common load circuit and means connecting that load circuit to both emitter electrodes and to the associated one of the first gating circuits to apply a gating signal to render that gating circuit responsive to the pulses when the two predetermined signals are applied to the two base electrodes respectively of these transistors; wherein one transistor of each said first coincidence circuit has its base electrode connected to the third circuit means, wherein the other transistor of one first coincidence circuit has its base electrode connected to the fourth circuit means, and wherein the other transistor of each remaining first coincidence circuit has its base electrode connected to the fifth circuit means.

4. An electric pulse counting circuit comprising first, second, third and fourth stages to store digits of fourth, third, second and most significance respectively in the number counted; each said stage comprising first and second input circuits, first and second output circuits and two transistors that are cross-connected to form bistable switching means which is connected to said input and output circuits and which is switchable by pulses supplied to said first and second input circuits to first and second stable states wherein a predetermined output signal is supplied to said first and second output circuits respectively; an input path to receive the pulses to be counted; first and second gating circuits connected between said path and said first and second input circuits respectively of each said stage to facilitate the selective application of pulses on that path to said first input circuits and to said second input circuits; circuit means connecting said first and second output circuits of said first stage to said second and first gating circuits of that stage to render these two gating circuits responsive alternately to said pulses; a first coincidence circuit connected to said second output circuits of said first and second stages and to said first gating circuit of said second stage to render this first gating circuit responsive to said pulses when said switching means of said first and second stages both have said second stable state; a second coincidence circuit connected to said first coincidence circuit and also to said second output circuit and said first gating circuit of said third stage to render this first gating circuit responsive to said pulses when said switching means of said first, second and third stages all have said second stable state; a third coincidence circuit connected to said second coincidence circuit and also to said second output circuit and said first gating circuit of said fourth stage to render this first gating circuit responsive to said pulses when said switching means of all four said stages have said second stable state; a fourth coincidence circuit connected to said second output circuit of said first stage and also to said first output circuit and said second gating circuit of said second stage to render this second gating circuit responsive to said pulses when said switching means of said first and second stages have said second and first stable states respectively; a fifth coincidence circuit connected to said first coincidence circuit and also to said first output circuit and said second gating circuit of said third stage to render this second gating circuit responsive to said pulses when said switching means of said first and second stages both have said second stable state and said switching means of said third stage has said first stable state; and a sixth coincidence circuit connected to said second coincidence circuit and also to said first output circuit and said second gating circuit of said fourth stage to render this second gating circuit responsive to said pulses when said switching means of said first, second and third stages all have said second stable state and said switching means of said fourth stage has said first stable state, the stable states to which said switching means are switched by said pulses representing the number counted in a binary scale of notation.

5. An electric pulse counting circuit comprising first second, third and fourth stages to store digits of fourth, third, second and most significance respectively in the number counted; each said stage comprising first and second input circuits, first and second output circuits and two transistors that are cross-connected to form bistable switching means which is connected to said input and output circuits and which is switchable by pulses supplied to said first and second input circuits to first and second stable states wherein a predetermined output signal is supplied to said first and second output circuits respectively; an input path to receive the pulses to be counted; a plurality of first gating circuits connected between said first input circuits respectively and said input path to facilitate the selective application of pulses on that path to these first input circuits; a plurality of second gating circuits connected between said second input circuits respectively and said input path to facilitate the selective application of pulses on that path to these second input circuits; circuit means connecting said first and second output circuits of said first stage to said second and first gating circuits respectively of that stage to render these gating circuits alternately responsive to said pulses; a first coincidence circuit connected to said second output circuits of said first and second stages and to said first gating circuit of said second stage to render this first gating circuit responsive to said pulses when said switching means of said first and second stages both have said second stable state; a second coincidence circuit connected to said second output circuit and said first gating circuit of said third stage and to said first coincidence circuit to render this first gating circuit responsive to said pulses when said switching means of said first, second and third stages all have said second stable state; a third coincidence circuit connected to said second output circuits of said first and fourth stages and to said first gating circuit of said fourth stage to render this first gating circuit responsive to said pulses when said switching means of said first and fourth stages both have said second stable state; a fourth coincidence circuit connected to said second output circuit of said first stage, to said first output circuits of said second and fourth stages and to said second gating circuit of said second stage to render this second gating circuit responsive to said pulses when said switching means of said first stage has said second stable state and said switching means of said second and fourth stages have said first stable state; a fifth coincidence circuit connected to said first coincidence circuit and to said first output circuit and second gating circuit of said third stage to render this second gating circuit responsive to said pulses when said switching means of said first and second stages have said second stable state and said switching means of said third stage has said first stable state; and a sixth coincidence circuit connected to said second coincidence circuit and to said first output circuit and second gating circuit of said fourth stage to render this second gating circuit responsive to said pulses when said switching means of said first, second and third stages have said second stable state and said switching means of said fourth stage has said first stable state, the stable states to which said switching means are switched by said pulses representing the number counted in a binary-coded decimal scale of notation.

6. An electric pulse counting circuit comprising a plurality of stages which are each to store a digit of different significance in the number counted, each stage comprising first and second input circuits, first and second output circuits, an output path and two transistors that are cross-connected to form bi-stable switching means which is connected to said input and output circuits and which is switchable, by pulses supplied to the first and second input circuits, to first and second stable states wherein a predetermined output signal is supplied to the first and second output circuits respectively; an input path to receive the pulses to be counted; first gating circuits connected between the first input circuits respectively and the input path; second gating circuits connected between the second input circuits respectively and the input path; these first and second gating circuits facilitating the selective application of pulses on the input path to the input circuits; circuit means connecting the first and second output circuits of the stage that is to store the digit of lowest significance in said number to the second and first gating circuits respectively of that stage to render these two gating circuits responsive alternately to said pulses; further circuit means connecting the second output circuit and the output path of this stage; a separate first coincidence circuit for each remaining stage, each first coincidence circuit having outputs connected to the first gating circuit and the output path of its stage and having inputs which are connected to the second output circuit of its stage and the output path of a preceding stage and which thus are associated with a combination of said output circuits; and a separate second coincidence circuit for each remaining stage, each second coincidence circuit having an output connected to the second gating circuit of its stage and having inputs which are connected to the first output circuit of its stage and the output path of a preceding stage and which thus are associated with a combination of said output circuits, these first and second coincidence circuits being adapted to respond to coincidences of the predetermined output singal on the combinations of the output circuits associated with their inputs to render the gating circuits connected to their outputs responsive to said pulses selectively whereby said switching means are switched by said pulses to particular stable states thereof representing the number counted in a binary scale of notation.

References Cited in the file of this patent

UNITED STATES PATENTS

| | | |
|---|---|---|
| 2,774,868 | Havens | Dec. 18, 1956 |
| 2,853,238 | Johnson | Sept. 28, 1958 |
| 2,888,556 | Richards | May 26, 1959 |
| 2,892,953 | McVey | June 30, 1959 |
| 2,971,157 | Harper | Feb. 7, 1961 |